US008849616B2

(12) United States Patent
Mehta et al.

(10) Patent No.: US 8,849,616 B2
(45) Date of Patent: Sep. 30, 2014

(54) METHOD AND SYSTEM FOR NOISE SIMULATION ANALYSIS USEABLE WITH SYSTEMS INCLUDING TIME-OF-FLIGHT DEPTH SYSTEMS

(75) Inventors: Swati Mehta, San Jose, CA (US); Cyrus Bamji, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 12/804,863

(22) Filed: Jul. 30, 2010

(65) Prior Publication Data

US 2011/0295562 A1 Dec. 1, 2011

Related U.S. Application Data

(60) Provisional application No. 61/273,497, filed on Aug. 4, 2009.

(51) Int. Cl.

| H03F 1/26 | (2006.01) |
|---|---|
| G01S 17/36 | (2006.01) |
| G01S 7/493 | (2006.01) |
| G01S 7/491 | (2006.01) |
| H04N 17/00 | (2006.01) |
| H04N 5/357 | (2011.01) |

(52) U.S. Cl.
CPC ............... *G01S 17/36* (2013.01); *H04N 17/002* (2013.01); *G01S 7/493* (2013.01); *H04N 5/357* (2013.01); *G01S 7/4915* (2013.01)
USPC ............................................................ 702/191

(58) Field of Classification Search
USPC ............................................................ 702/191
See application file for complete search history.

(56) References Cited

U.S. PATENT DOCUMENTS 7,490,576 B2 * 2/2009 Metcalfe et al. ........... 119/14.08
7,620,202 B2 * 11/2009 Fujimura et al. ............. 382/103

* cited by examiner

*Primary Examiner* — Aditya Bhat
(74) *Attorney, Agent, or Firm* — Gregg Wisdom; Sergey Lamansky; Micky Minhas

(57) ABSTRACT

An analytical tool useable with complex systems receives as input various system parameters to predict whether sufficiently accurate quality depth data will be provided by the TOF system. Depth data quality estimates involve dividing system operation into smaller operations whose individual depth data quality contributions can be more readily computed. The effect of the individual operations is combined and the tool outputs a depth data quality estimate accounting for the net result of the various unique operations performed by the system. When used with a TOF system, input parameters may include magnitude and angular distribution of TOF emitted optical energy, desired signal/noise, sensor characteristics, TOF imaging optics, target object distances and locations, and magnitude of ambient light. Analytical tool output data can ensure adequate calculation accuracy to optimize the TOF system pre-mass production, even for TOF systems whose sequence of operations and sensor operations are flexibly programmable.

14 Claims, 6 Drawing Sheets

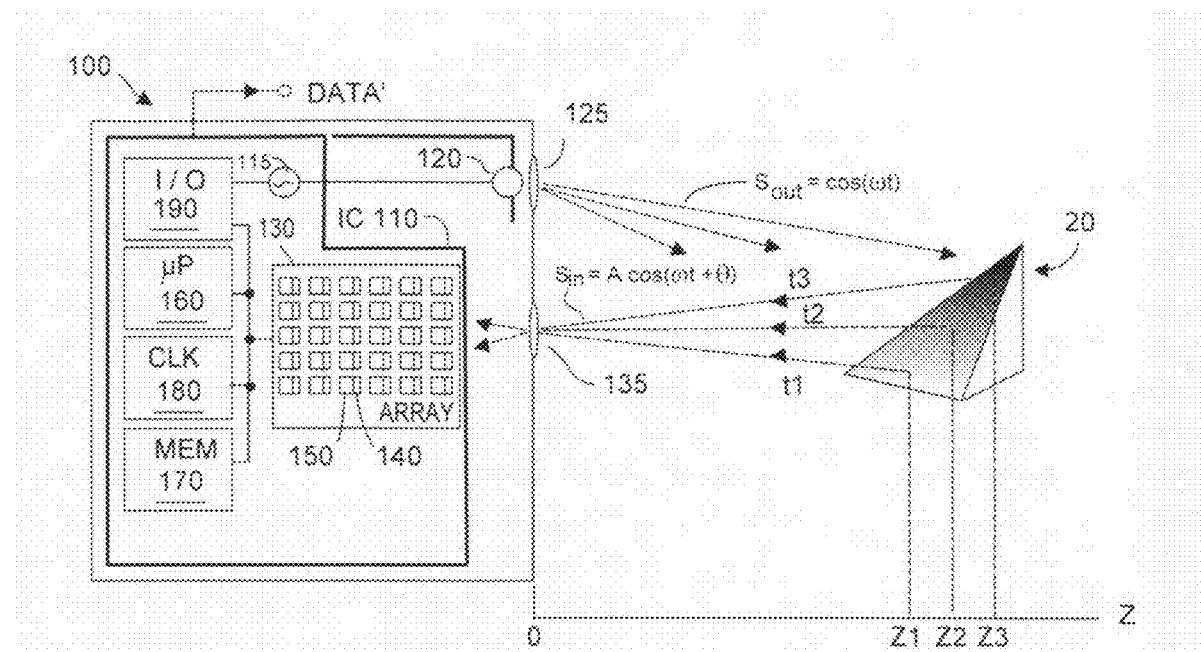
FIG. 2A (PRIOR ART)
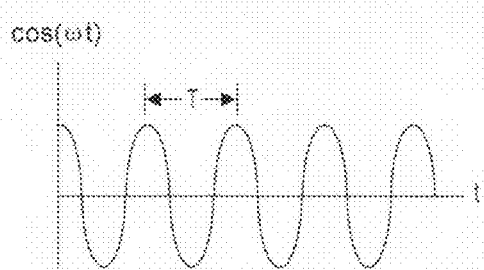
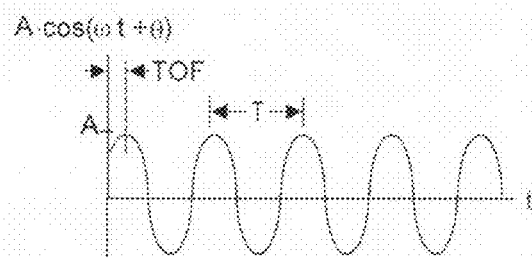
FIG. 2B (PRIOR ART)   FIG. 2C (PRIOR ART)

INPUT SIGNAL PARAMETERS FOR TOOL

PROGRAMMABLE ADC AND PIXEL PARAMETERS

METHOD AND SYSTEM FOR NOISE SIMULATION ANALYSIS USEABLE WITH SYSTEMS INCLUDING TIME-OF-FLIGHT DEPTH SYSTEMS

RELATION TO CO-PENDING APPLICATION

Priority is claimed to U.S. provisional patent application Ser. No. 61/273,497 filed 4 Aug. 2009, entitled "Method and System for Noise Simulation Analysis Useable with Time-of-Flight Depth Systems", assigned to Canesta, Inc., of Sunnyvale, Calif., assignee herein.

FIELD OF THE INVENTION

The present invention relates generally to noise simulation analysis of systems, including time-of-flight (TOF) depth systems, and more particularly to providing a more accurate noise simulation analysis to predict adequacy of system design, including TOF system design, in view of desired performance specifications.

BACKGROUND OF THE INVENTION

System designers are often faced with predicting system performance, which prediction should take into account the effect of noise at various steps or stages in the system process. An unduly pessimistic prediction of system performance can result in an over-design that generally is more expensive to provide than if a more accurate prediction of system performance could have been made. For example in a depth imaging system, it is desired to meet certain design specifications that are provided a priori. However if the predicted system performance is too pessimistic, the designer may compensate by generating more illumination power than is reasonably necessary, a solution that adds cost to the design, and consumes additional operating power. On the other hand if the predicted system performance is too optimistic, the end design may fail to meet specification.

System performance may be thought of as a sequence of processing steps that collectively represent a processing pipeline. A challenge then is how best to account for the effect of noise upon a signal/noise (S/N) ratio at various steps in the processing pipeline. Noise from independent sources is typically not correlated and is generally accounted for using a root-mean-square (RMS) approach. Since the RMS is always positive, in a typical noise analysis model, the contribution of noise is additive and increases at each stage in the processing pipeline. However not all noise is uncorrelated as portions of each noise may even originate from the same noise source. Under such circumstances an RMS approach yields inaccurate often overly pessimistic results.

In very simply systems in which there are but a few processing steps, a closed form symbolic representation approach is often used. An equivalent RMS noise model may be used for each stage. However in more complicated systems including imaging or depth systems, a simulation based model is used. In a simulation based model, the effect of injected noise, i.e., a random variable, into each stage of the processing pipeline is considered, and the system output is examined multiple times, perhaps thousands of times to get a good statistical data-set of the noise. Understandably it is challenging to attempt to accurately and separately model noise at every stage in the pipeline processing system. In prior art techniques, in a simulation based method, separation of noise and signal is not maintained. In a simulation based model, the signal and multiple noise contributions are added together and propagated through the sequence of operations as a single variable Embodiments of the present invention work well with systems that include imaging and depth systems. Thus, it is useful at this point to briefly describe such systems, with which embodiments of the present invention may be used.

Conventional color (red, green, blue or RGB) imaging cameras are well known in the art. Such cameras typically use ambient light to image a scene onto a sensor array comprising many RGB pixels, and produce a color value at each pixel in the sensor array. On the other hand, comparatively newer so-called three-dimensional depth or imaging cameras or systems are more sophisticated and use active light to image a scene onto a sensor array comprising many depth (or z) pixels. (The terms TOF systems and TOF cameras may be used interchangeably herein.) Such cameras produce a z distance value at each pixel in the sensor array. Some depth systems have been developed using spaced-apart stereographic cameras. However these systems experience ambiguity problems associated with two spaced-apart cameras viewing a target object, and acquiring two images from slightly different vantage points. A superior type of prior art three-dimensional system (or camera) may advantageously be constructing using time-of-flight (TOF) technology.

A relatively accurate class of depth or Z distance TOF systems has been pioneered by Canesta, Inc., assignee herein. Various aspects of TOF imaging systems are described in the following patents assigned to Canesta, Inc.: U.S. Pat. No. 7,203,356 "Subject Segmentation and Tracking Using 3D Sensing Technology for Video Compression in Multimedia Applications", U.S. Pat. No. 6,906,793 "Methods and Devices for Charge Management for Three-Dimensional Sensing", and U.S. Pat. No. 6,580,496 "Systems for CMOS-Compatible Three-Dimensional Image Sensing Using Quantum Efficiency Modulation", U.S. Pat. No. 6,515,740 "Methods for CMOS-Compatible Three-Dimensional image Sensing Using Quantum Efficiency Modulation".

FIG. 1 depicts an exemplary TOF system, as described in U.S. Pat. No. 6,323,942 entitled "CMOS-Compatible Three-Dimensional Image Sensor IC" (2001), which patent is incorporated herein by reference as further background material. TOF system 10 can be implemented on a single IC 110, without moving parts and with relatively few off-chip components. System 10 includes a two-dimensional array 130 of Z or depth detectors 140, each of which has dedicated circuitry 150 for processing detection charge output by the associated detector. Collectively a detector 140 and its dedicated circuitry 150 comprises a depth pixel, or simply pixel. In a typical application, pixel array 130 might include 100×100 pixels 140, and thus include 100×100 processing circuits 150. (Sometimes the terms pixel detector, or pixel sensor, or simply pixel or sensor are used interchangeably.) IC 110 preferably also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations, which may be output as DATA.

Under control of microprocessor 160, a source of active optical energy 120, typical IR or NIR wavelengths, is periodically energized. Energized source 120 emits optical energy $S_{out}$ via lens 125 toward an object target 20 a depth distance z away from system 10. Typically the optical energy is light, for example emitted by a laser diode or LED device 120. Some of the emitted optical energy will be reflected off the surface of target object 20 as reflected energy $S_{in}$. This reflected energy passes through an aperture field stop and lens, collectively 135, and will fall upon two-dimensional array 130 of pixel detectors 140 where a depth or Z image is formed. In some implementations, each imaging pixel detector 140 captures time-of-flight (TOF) required for optical energy transmitted by emitter 120 to reach target object 20 and be reflected back for detection by two-dimensional sensor array 130. Using this TOF information, distances Z can be determined as part of the DATA signal that can be output elsewhere, as needed. Typically ambient light, e.g., sunlight, will also enter lens 135 and, unless appropriately handled by TOF system 10, can affect the detection performance of sensor array 130.

Emitted optical energy $S_1$ traversing to more distant surface regions of target object 20, e.g., Z3, before being reflected back toward system 10 will define a longer time-of-flight than radiation falling upon and being reflected from a nearer surface portion of the target object (or a closer target object), e.g., at distance Z1. For example the time-of-flight for optical energy to traverse the roundtrip path noted at t1 is given by t1=2·Z1/C, where C is velocity of light. TOF sensor system 10 can acquire three-dimensional images of a target object in real time, simultaneously acquiring both luminosity data (e.g., signal brightness amplitude) and true TOF distance (Z) measurements of a target object or scene. Most of the Z pixel detectors in Canesta-type TOF systems the property that each individual pixel acquires vector data in the form of luminosity information and also in the form of Z distance information.

A more modern class of TOF sensor systems are so-called phase-sensing TOF systems. Most current Canesta, Inc. phase-sensing or phase-type TOF systems includes Z-pixel detectors that acquires vector data in the form of luminosity and depth or z distance information. Such TOF systems construct a depth image (DATA') by examining relative phase shift between the transmitted light signals $S_{out}$ having a known phase, and acquired signals $S_{in}$ reflected from the target object. Exemplary such phase-type TOF systems are described in several U.S. patents assigned to Canesta, Inc., assignee herein, including U.S. Pat. No. 6,515,740 "Methods for CMOS-Compatible Three-Dimensional Imaging Sensing Using Quantum Efficiency Modulation", U.S. Pat. No. 6,906,793 entitled "Methods and Devices for Charge Management for Three Dimensional Sensing, U.S. Pat. No. 6,678,039 "Method and System to Enhance Dynamic Range Conversion Useable With CMOS Three-Dimensional Imaging", U.S. Pat. No. 6,587,186 "CMOS-Compatible Three-Dimensional Image Sensing Using Reduced Peak Energy", U.S. Pat. No. 6,580,496 "Systems for CMOS-Compatible Three-Dimensional Image Sensing Using Quantum Efficiency Modulation". Exemplary detector structures useful for TOF systems are described in U.S. Pat. No. 7,352,454 entitled "Methods and Devices for Improved Charge Management for Three-Dimensional and Sensing".

FIG. 2A is based upon above-noted U.S. Pat. No. 6,906,793 and depicts an exemplary phase-type TOF system in which phase shift between emitted and detected signals, respectively, $S_{out}$ and $S_{in}$ provides a measure of distance Z to target object 20. Under control of microprocessor 160, active optical energy source 120 is periodically energized by an exciter 115, and emits output modulated optical energy $S_1=S_{out}=\cos(\omega t)$ having a known phase towards object target 20. Emitter 120 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms).

Some of the emitted optical energy (denoted $S_{out}$) will be reflected (denoted $S_2=S_{in}$) off the surface of target object 20, and will pass through aperture field stop and lens, collectively 135, and will fall upon two-dimensional array 130 of pixel or photodetectors 140. When reflected optical energy $S_{in}$ impinges upon photodetectors 140 in pixel array 130, charges within the photodetectors are released, and converted into tiny amounts of detection current. For ease of explanation, incoming optical energy may be modeled as $S_{in}=A\cdot\cos(\omega\cdot t+\theta)$, where A is a brightness or intensity coefficient, $\omega\cdot t$ represents the periodic modulation frequency, and θ is phase shift. As distance Z changes, phase shift θ changes, and FIGS. 2B and 2C depict a phase shift θ between emitted and detected signals, $S_1$, $S_2$. The phase shift θ data can be processed to yield desired Z depth information. Within array 130, pixel detection current can be integrated to accumulate a meaningful detection signal, used to form a depth image. In this fashion, TOF system 100 can capture and provide Z depth information at each pixel detector 140 in sensor array 130 for each frame of acquired data.

As with the embodiment of FIG. 1, unless adequately handled, ambient light can affect detection by array 130, and thus overall performance of TOF system 100. Canesta, Inc. has received several U.S. patents directed to use of common mode resets (CMR), charge dumps (DUMP), and other techniques to cope with mal-effects of ambient light. These patents include U.S. Pat. Nos. 7,321,111 and 7,157,685 entitled "Method and System to Enhance Differential Dynamic Range and Signal/Noise in CMOS Range Finding Systems Using Differential Sensors", and U.S. Pat. No. 7,176,438 entitled "Method and System to Differentially Enhance Sensor Dynamic Range Using Enhanced Common Mode Reset".

In typical operation, pixel detection information is captured at least two discrete phases, preferably 0° and 90°, and is processed to yield Z data. System 100 yields a phase shift θ at distance Z due to time-of-flight given by:

$$\theta=2\cdot\omega\cdot Z/C=2=(2\cdot\pi\cdot f)\cdot Z/C \quad (1)$$

where C is the speed of light, 300,000 Km/sec. From equation (1) above it follows that distance Z is given by:

$$Z=\theta\cdot C/2\cdot\omega=\theta\cdot C/(2\cdot 2\cdot f\cdot\pi) \quad (2)$$

Note when $\theta=2\cdot\pi$, there will be an aliasing interval range associated with modulation frequency f given by:

$$Z_{AIR}=C/(2\cdot f) \quad (3)$$

In practice, changes in Z produce change in phase shift θ although eventually the phase shift begins to repeat, e.g., $\theta=\theta+2\cdot\pi$, etc. Thus, distance Z is known modulo $2\cdot\pi\cdot C/2\cdot\omega)=C/2\cdot f$, where f is the modulation frequency.

The performance of an overall TOF system 100 can change as a function of many parameters. For example system performance increases with increasing light source power emitted by source 120. In practice, determining proper characteristics for optics, e.g., 125, 135, and for light source power from source 120 needed to meet performance level specification of TOF system 100 for an application can be a tedious and error prone task. But such analysis is required to know whether a design for a three-dimensional system can meet specification within cost budget for a particular application. Later when the TOF system is designed for mass production, the analysis task must be repeated but with greater accuracy to try to account for all possible optimizations, to realize best system performance at lowest cost.

System analysis tools that can compute the depth data quality of a TOF system such as system 10 in FIG. 1, or system 100 in FIG. 2A are typically produced by the vendor of the IC chip, e.g., IC 110 upon which much of the system is fabricated. As to the source of emitted optical energy, such tools seek to take into consideration light source electrical characteristics including power, wavelength, and rise/fall times of laser 120, as well as optical characteristics including diffuser and beam shaper characteristics. Further such tools seek to take into account sensor electrical characteristic including modulation frequency, flicker and Shot noise, as well as optical characteristics including f/stop of the imaging lenses. In all, such analysis tools attempt to produce an estimate of the quality of the depth data (DATA') generated by TOF system 100, preferably on a per pixel per frame accuracy and uncertainty basis. There is a need to enhance quality and accuracy of such prior art tools, which typically involves computing closed form expressions for total signal and noise. Simply stated, computing system signal/noise for all but trivial sequences is generally beyond the realm of a closed form expression. Prior art tools can no longer be relied upon to accurately predict TOF system performance in terms of computing the depth data quality without substantial error. As noted, inaccurate predictions that are too pessimistic can result in system over-design, and design predictions that are unduly optimistic can result in system under-design.

In short, many systems, including imaging systems and depth systems, especially TOF systems and sensor arrays, have evolved beyond what the relatively simple prior art analytical tools can handle. Modern TOF systems have complex operating sequences and operations, whose complexity precludes readily accurately computing noise per sequence in a closed form analytical equation expression.

What is needed then for use with systems, especially complex systems that may include imaging systems, depth systems and especially TOF systems, is an analytical tool that can receive as input data parameters including emitted optical energy and its angular distribution, desired signal/noise, sensor characteristics, TOF imaging optics, possible target object z distances and locations, and magnitude of ambient light. Such tool should provide a method to automate the analysis task to quickly ascertain feasibility of a given design to a desired application. When used with depth systems such as TOF systems, the analytical tool should compute quality of the depth data output by the TOF system, preferably characterized in terms of number of pixels in the systems fields of view, and depth accuracy and jitter uncertainty at each pixel or collection of pixels. Such tool should ensure adequate calculation accuracy to optimize the TOF system before it goes into mass production. Such tool should perform with TOF systems whose sequence of operations and sensor operations is flexibly programmable. Preferably TOF system signal and noise should be combined while taking into account sequence nuances as they pertain to TOF system accumulated signal and noise. Such analytical or computational tool should be simple to use yet provide higher accuracy in estimating TOF system performance than can be achieved by prior art methods.

The present invention provides such an analytical tool and method for use with modern TOF systems that include complex operating modes.

SUMMARY OF THE INVENTION

The present invention provides such an analytical tool and method to calculate or estimate the quality of data for use with systems, especially complex systems whose computing pipeline has more than a few processing steps. Systems with which the present invention may be used can include imaging systems, depth systems including modern TOF systems that include complex operating modes. When used with imaging systems and TOF systems, embodiments of the present invention compute accurate depth data quality using an effective and structured method to cope with this added complexity. Accurate depth data quality estimates are provided, preferably by breaking down TOF system operation into manageable chunks or unique operations whose depth data quality can be more readily computed. In general, the contribution of a single noise source is computed, and the additive and subtractive contributions of multiple noise sources are combined. Combination is such that the correlation or non-correlation of noise sources is accounted for. Embodiments of the present invention then combine the effect of the individual operations as they are applied in the overall system. The invention provides an estimate of the depth data quality that takes into account the net result of all the various unique operations performed by the system, including TOF systems. While embodiments of the present invention preferably compute independent statistical models, the associated noise contributions need not always be combined in an RMS fashion. When used for prediction of TOF system design, embodiments of the present invention receive as input various TOF system parameters including emitted optical energy and its angular distribution, desired signal/noise, sensor characteristics, TOF imaging optics, possible target object z distances and locations, and magnitude of ambient light. The present invention enables automated analysis enabling quick determination feasibility of a given design to a desired application. In some embodiments, output of the analytical tool provides quality of the depth data output by the TOF system, preferably characterized in terms of number of pixels in the systems fields of view, and depth accuracy and jitter uncertainty at each pixel or collection of pixels. Output data from the analytical tool can ensure adequate calculation accuracy to optimize the TOF system before it goes into mass production, even for TOF systems whose sequence of operations and sensor operations are flexibly programmable.

In a modern TOF system operation, four exemplary operation modes may be considered: RESET mode in which KT/C noise is present, INTEGRATE mode in which Shot noise is present, CMR (common mode reset) mode in which KT/C noise, which is different from the above-noted RESET KT/C noise, is present, and a DUMP mode in which analog/digital conversion noise and read noise is present. As described later herein, embodiments of the present invention seek to intelligently keep track of each noise contribution independently and separately as the particular noise contribution propagates through the processing pipeline. The effect is that each noise contribution is self-correlating and may be added without use of RMS. Thus, self-correlated noise contribution with a negative sign may well cancel out at least a portion of self-correlated noise contribution with a positive sign. Such cancellation could not occur if the noise contributions were treated as uncorrelated, as always-positive RMS addition would have to be used. In practice, embodiments of the present invention provide less pessimistic designs that meet specification, without the substantial over-design that use of prior art noise analysis contribution would suggest.

In a preferred embodiment, signal to noise (S/N) of an electrical system having a sequence of operations Oi is estimated as follows, where each of operations Oi combines a signal and statistical noise from prior operations in the sequence with signal and statistical noise at a current operation in said sequence of operations Oi. Preferably at each sequence in the operations Oi, the effects of each independent statistical noise source are computed and combined independently of other independent statistical noise sources such that each independent statistical noise source is self-correlating. Thus, some of the effects may have a positive sign and others may have a negative sign, with some cancelation occurring.

The final noise contribution of each independent statistical noise source at an output of said system is combined to yield a final statistical noise estimate for the system. Advantageously, the final statistical noise estimate will be less pessimistic than if arrived at using a prior art statistical noise model that combines the correlated/uncorrelated noise sources in a RMS additive fashion at each operation Oi in a sequence of such operations. The desired result is a more reasonable design that meets specification without being unduly over-designed. Aspects of the present invention may be implemented in hardware and/or software. The electrical system for which the present invention provides estimates may, but need not be, a TOF depth system.

Other features and advantages of the invention will appear from the following description in which the preferred-embodiments have been set forth in detail, in conjunction with the accompany drawings.

BRIEF DESCRIPTION OF THE DRAWINGS

FIG. 2A depicts a phase-based TOF range finding system, according to the prior art;

FIGS. 2B and 2C depict phase-shifted signals associated with the TOF range finding system of FIG. 2A, according to the prior art;

DETAILED DESCRIPTION OF THE PREFERRED EMBODIMENTS

Figure 1:
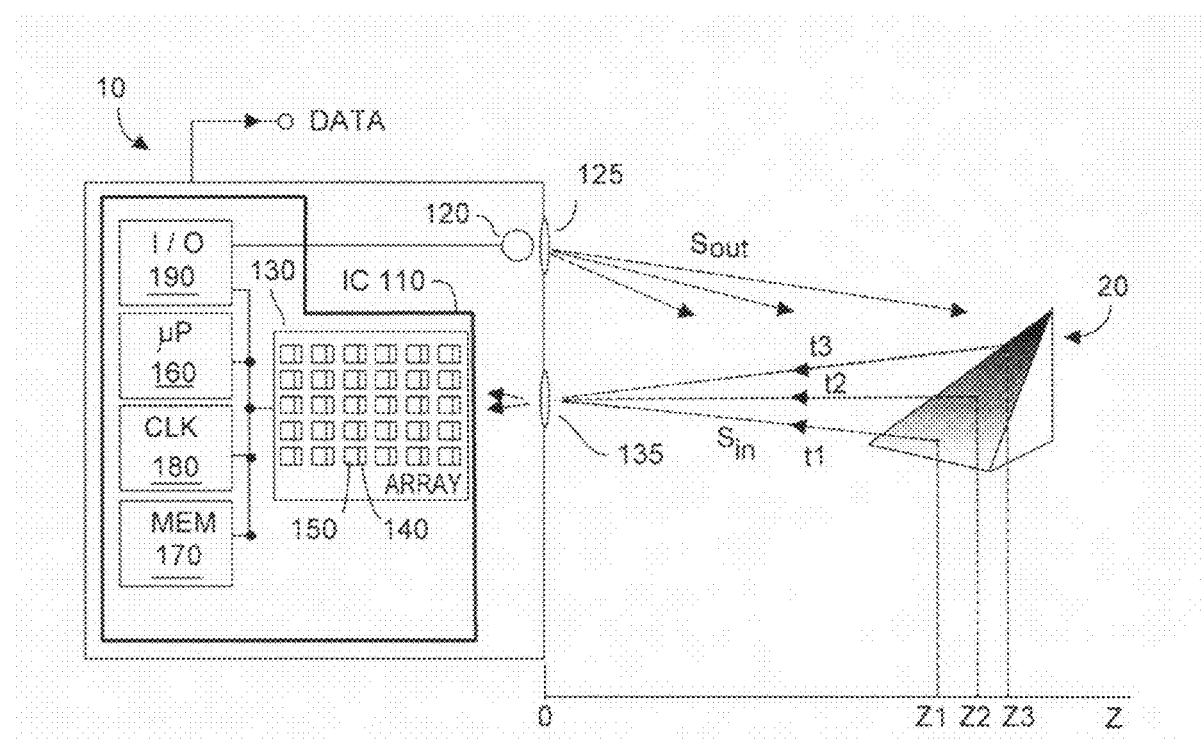
FIG. 1 depicts a time-of-flight (TOF) range finding system, according to the prior art.
Figure 3:
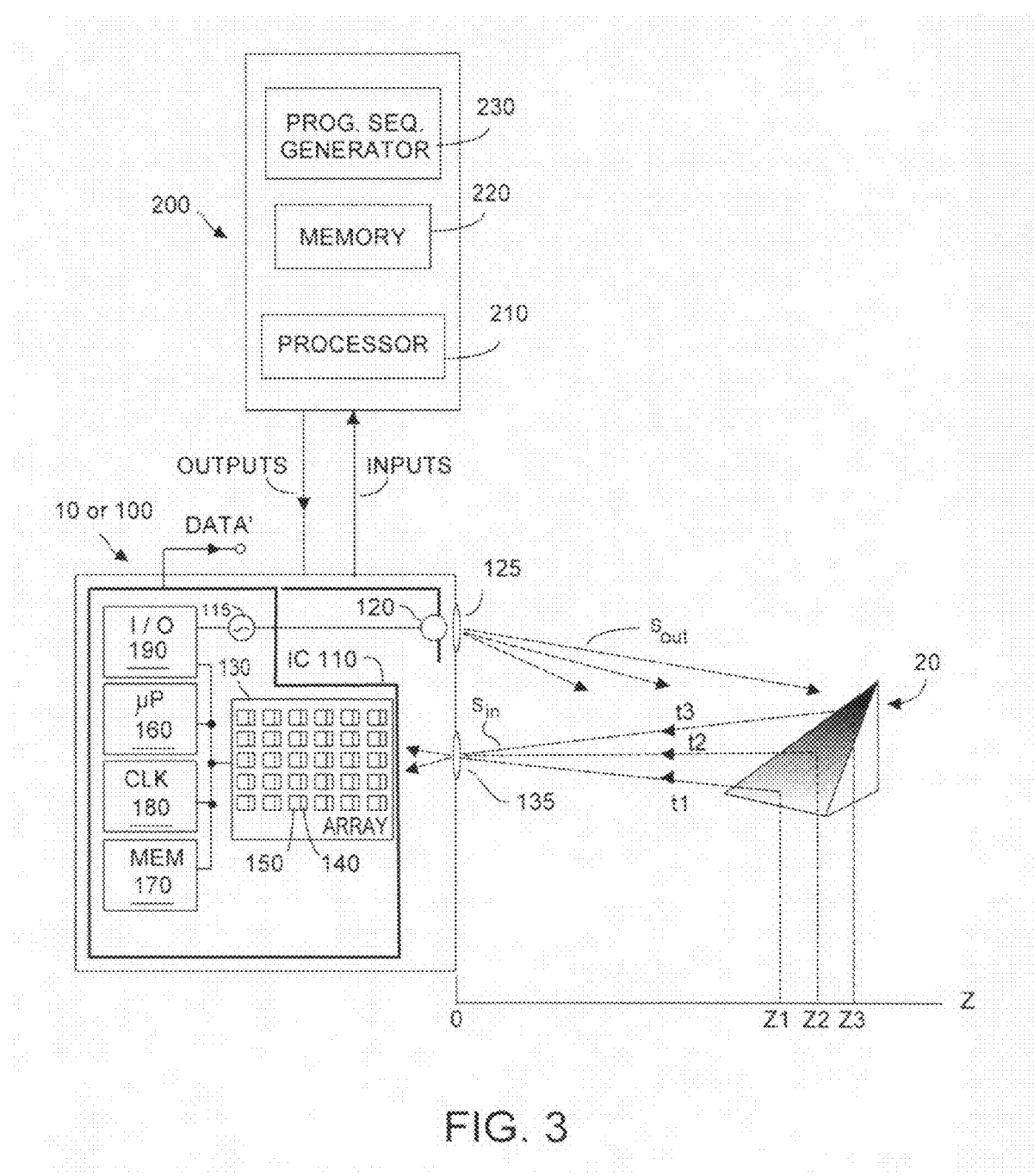
FIG. 3 depicts an embodiment of the present invention used with a TOF system, according to embodiments of the present invention.

Although embodiments of the present invention may be used for noise analysis simulation with many types of systems, use of the present invention with a complicated system such as a Canesta, Inc. type TOF system will be described. FIG. 3 depicts a TOF system, for example TOF system 10 as described with respect to FIG. 1, or perhaps a phase-based TOF system 100 as described with respect to FIG. 2A, coupled to an embodiment of the present invention 200. An analytical tool or method 200 according to embodiments of the present invention includes a processor 210, memory 220 that includes space to store input parameters and space to store a routine executable by processor 210 to carry out the analysis described herein. Tool 200 preferably further includes a programmable sequence generator 230 that can, in analysis mode, command sequence operation of the TOF system. In use, tool 200 is coupled to the TOF system to receive various inputs. The outputs from tool 200 are available to the TOF system designer, and as indicated in phantom, could be coupled to the TOF system to provide closed-loop control. For example, in a particular application it may be possible to reduce magnitude of the output optical energy from emitter 120. Tool 200 could be used closed-loop to set such optical power level.

As used herein, "sequences" are basically a combination and ordering of symbols, e.g., S0, I0, where each symbol translates into an instruction to be executed. In the exemplary sequence noted later herein, six samples are used. Flexible and complex sequences are not readily expressed simply by changing parameters on a fixed flow chart. Rather, the flow-chart itself must be modified to adapt to the new sequence. To enable this flexibility, applicants have developed a new architecture called microcoded architecture. In preferred embodiments, each of the various operations on the IC chip is associated with a symbol, and each symbol is associated with waveforms for a set of signals associated with that symbol. Preferably a string of such symbols is used to define the operating sequence of the IC chip. Preferably the string of instructions can be stored in memory on chip, and a preferably on chip microcontroller interprets the string. Each time a symbol is executed, waveforms associated with that symbol are applied to the signals associated with the symbol.

When the TOF system 10 or 100 is subjected to a complex operating sequence, sensors 140 in array 130 accumulate signal and noise from the various operations or steps. In one embodiment, analysis tool 200 preferably computes the additional signal and noise from each operation $O_i$ and augments the already accumulated signal and noise components with these computed signal and noise components. The system preferably keeps track of the accumulated total signal and noise from the portion of the sequence that has been executed thus far. Such intermediate data may be stored in memory 220, or indeed elsewhere.

It is sometimes preferred that the analysis tool track different individual signal/noise separately before they are used to augment or be aggregated into the final signal/noise values. Effectively, such individual noise components are treated as being self-correlating, such that their contribution to signal/noise at various steps in the processing pipeline may be added or subtracted without having to use RMS values, which are of course always positive. For example, in some embodiments a special signal $SN_A$ is useful in calculating the noise power $SN_D^0$. Accordingly $SN_A$ is stored, e.g., in memory 220 or elsewhere, and is updated during some TOF system operations, e.g., S0, D0, S180, D180, and is finally reset upon occurrence of a specific operation, i.e., D0E. When a specific kind of operation is encountered, e.g., D0E, an actual noise power value is computed from this accumulated signal value before it is reset. The so computed noise power value is then combined with an existing accumulated noise value $SN_D^0$.

Each operation $O_i$ can now modify the accumulated signal and noise in the system, e.g., as follows:

(1) an additional signal $S_i$ is created by operation $O_i$, as governed by output from programmable sequence generator 230 preferably operating under control of processor 210;

(2) an additional noise signal $N_i$ is created by operation $O_i$ that could include different types of noise e.g., KT/C noise, although analog-digital conversion (ADC) noise may have to be handled differently;

(3) the total signal accumulated before step i, $TS_{i-1}$, is modified and combined with additional signal $S_i$ to yield a new accumulated signal $TS_i = f_i(TS_{i-1}, S_i)$. Note that there may be different $TS_i$ values for different modes; and (4) the total noise accumulated before step i, $TN_{i-1}$, is modified and combined with $N_i$ to yield a new accumulated noise $TN_i = g_i(TN_{i-1}, N_i)$. As noted earlier, in some embodiments multiple scalar values $N_{i-1}^j$ or $S_{i-1}^j$ of certain aspect of the noise or signal, respectively, may be used at step I, and multiple values of $N_i^j$ or $S_i^j$ may be output at step i.

Table 1 shows the different sources kinds of noise in a TOF system such as system 10 or 100.

TABLE 1

| Name | Typical Source | Typically Created during | Symbols | Typical formula | Comments |
|---|---|---|---|---|---|
| Shot Noise | Statistical fluctuation of captured photocharges | Integration of optical signal | $SN$, $SN_A$, $SN_D^0$ | $=\sqrt{(Signal)}$ | |
| Flicker Noise | Source follower Transistors | Readout | | $K/(C_{ox} \cdot WLf)$ | K is a process dependant parameter. |
| Thermal noise | Amplifiers | Readout | | $\sqrt{(4k_B TR \Delta f)}$ | $k_B$ is Boltzmann's Constant |
| KT/C noise | Switches opening and closing | CMR and reset | $KN^R$, $KN^C$, $KN_A^R$, $KN_A^C$, $KN_D^0$ | $\sqrt{(k_B T/C)}$ | |
| ADC noise | ADC | Readout | ADCQ | 0.289*LSB | LSB is least significant bit. |
| Digital Accumulation noise | Accumulator quantization | Accumulation of digital result | ACCQ | | |

Table 2 shows a typical list of operations and their meaning, where "aka" denotes also known as.

TABLE 2

| | |
|---|---|
| RST | Reset Pixel; |
| CL0 | Clear Digital Accumulator A0 for 0 (and 180) phase |
| I0 | Integrate with LS phase 0 for time T |
| I180 | Integrate with LS phase 180 for time T |
| CMR | Common Mode Reset |
| S0 | ADC pixel output to 9 bits and accumulate in digital accumulator A0 with '−' sign. (aka Start phase 0 integration) |
| D0 | ADC pixel output to 9 bits and accumulate in digital accumulator A0 with '+' sign. (aka Dump phase 0 integration) |
| S180 | ADC pixel output to 9 bits and accumulate in digital accumulator A0 with '+' sign. Similar result as D0. (aka Start phase 180 integration) |
| D180 | ADC pixel output to 9 bits and accumulate in digital accumulator A0 with '−' sign. Similar result as S0. (aka Dump phase 180 integration) |
| D0E | Same as D0 above except this is the last dump in a sequence before a RST occurs, (aka Dump phase 0 integration end) |
| X0 | Read Accumulator A0 |

Preferably each operation creates a signal and noise dependent on the photons impinging on the sensors, and dependent upon parameters of the parameterizable operation, e.g., shutter time. In this embodiment the sequence of operations assumes that for every Start phase "X" integration, e.g., S0, there is a corresponding Dump phase "X" integration, e.g., D0 or D0E. Each of these integration pairs increments a num_seq counter that is the index to keep track of noise and signal generated during that phase "X".

Table 3 below describes exemplary composition rules for the signal and noise for each operation described in Table 2. As such, Table 2 provides a specific example of the $TS_i$ & $TN_i$ described above.

TABLE 3

| | |
|---|---|
| RST | $S_A^{diff}$ = Reset Offset; <br> $KN^R$ = ktcnoise; |
| CL0 | A0 = 0; <br> $KN_D^0 = 0$; $SYSN_D^0 = 0$; $SN_D^0 = 0$; |
| I0 | $S_A^{diff} = S_A^{diff}$ + IntegrationTime · (Ambient · AmbientOffset + signal0); <br> $S_A^{cm} = S_A^{cm}$ + IntegrationTime · (Ambient + $\sqrt{(signal0^2 + signal90^2)}$/MC); <br> SN(num_seq) = $\sqrt{((SN(num\_seq))^2 + (IntegrationTime) \cdot (Ambient + \sqrt{(signal0^2 + signal90^2)}/MC))}$; |
| I180 | $S_A^{diff} = S_A^{diff}$ − IntegrationTime · (Ambient · AmbientOffset + signal0); <br> $S_A^{cm} = S_A^{cm}$ + IntegrationTime · (Ambient + $\sqrt{(signal0^2 + signal90^2)}$/MC); <br> SN(num_seq) = $\sqrt{((SN(num\_seq))^2 + (IntegrationTime) \cdot (Ambient + \sqrt{(signal0^2 + signal90^2)}/MC))}$; |
| CMR | $S_A^{diff} = S_A^{diff}$ · DifferentialRetentionRatio; <br> $S_A^{cm} = S_A^{cm}$ · (1 − CommonModeRecoveryRatio); <br> SN = SN · DifferentialRetentionRatio; <br> $KN^R = KN^R$ · DifferentialRetentionRatio; <br> $KN^C = KN^C$ · DifferentialRetentionRatio; <br> $KN^C(num\_seq) = \sqrt{KN^C(num\_seq)^2 + ktcnoisecmr^2}$; |
| S0 | A0 = A0 − q($S_A^{diff}$, 9) > where q(signal, #bits) is a function to convert given signal into a 9 bit digitized value. <br> $SYSN_D^0 = SYSN_D^0 + (ReadoutNoise)^2 + (ADCQ)^2 + (ACCQ)^2$; <br> $KN_A^R = KN_A^R − KN^R$; <br> $KN_A^C = KN_A^C − KN^C$; <br> num_seq = num_seq + 1; <br> $KN^R$(num_seq) = 0; $KN^C$(num_seq) = 0 <br> $SN_A = SN_A − SN$; <br> $SN_A$(num_seq) = 0; |

TABLE 3-continued

| | |
|---|---|
| D0 | $A0 = A0 + q(S_A^{diff}, 9)$ where q(signal, #bits) is a function to convert given signal into a 9 bit digitized value.<br>$SYSN_D^0 = SYSN_D^0 + (ReadoutNoise)^2 + (ADCQ)^2 + (ACCQ)^2$;<br>$KN_A^R = KN_A^R + KN^R$;<br>$KN_A^C = KN_A^C + KN^C$;<br>$SN_A = SN_A + SN$; |
| S180 | $A0 = A0 + q(S_A^{diff}, 9)$ where q(signal, #bits) is a function to convert given signal into a 9 bit digitized value.<br>$SYSN_D^0 = SYSN_D^0 + (ReadoutNoise)^2 + (ADCQ)^2 + (ACCQ)^2$;<br>$KN_A^R = KN_A^R + KN^R$;<br>$KN_A^C = KN_A^C + KN^C$;<br>num_seq = num_seq + 1;<br>$KN^R$(num_seq) = 0; $KN^C$(num_seq) = 0<br>$SN_A = SN_A + SN$;<br>$SN_A$(num_seq) = 0; |
| D180 | $A0 = A0 - q(S_A^{diff}, 9)$ where q(signal, #bits) is a function to convert given signal into a 9 bit digitized value.<br>$SYSN_D^0 = SYSN_D^0 + (ReadoutNoise)^2 + (ADCQ)^2 + (ACCQ)^2$;<br>$KN_A^R = KN_A^R - KN^R$;<br>$KN_A^C = KN_A^C - KN^C$;<br>$SN_A = SN_A - SN$; |
| D0E | $A0 = A0 + q(S_A^{diff}, 9)$ where q(signal, #bits) is a function to convert given signal into a 9 bit digitized value.<br>$SYSN_D^0 = SYSN_D^0 + (ReadoutNoise)^2 + (ADCQ)^2 + (ACCQ)^2$;<br>$KN_A^R = KN_A^R + KN^R$;<br>$KN_A^C = KN_A^C + KN^C$;<br>$SN_A = SN_A + SN$;<br>$KN_D^0 = KN_D^0 + (KN_A^R)^2 + (KN_A^C)^2$<br>$KN^R = 0$; $KN^C = 0$; $KN_A^R = 0$; $KN_A^C = 0$;<br>$SN_D^0 = SN_D^0 + (SN_A)^2$;<br>$SN = 0$; $SN_A = 0$; |
| X0 | $TN_D^0 = \sqrt{(SN_D^0 + KN_D^0 + SYSN_D^0)}$<br>Read $A0, TN_D^0$ |

Figure 6:
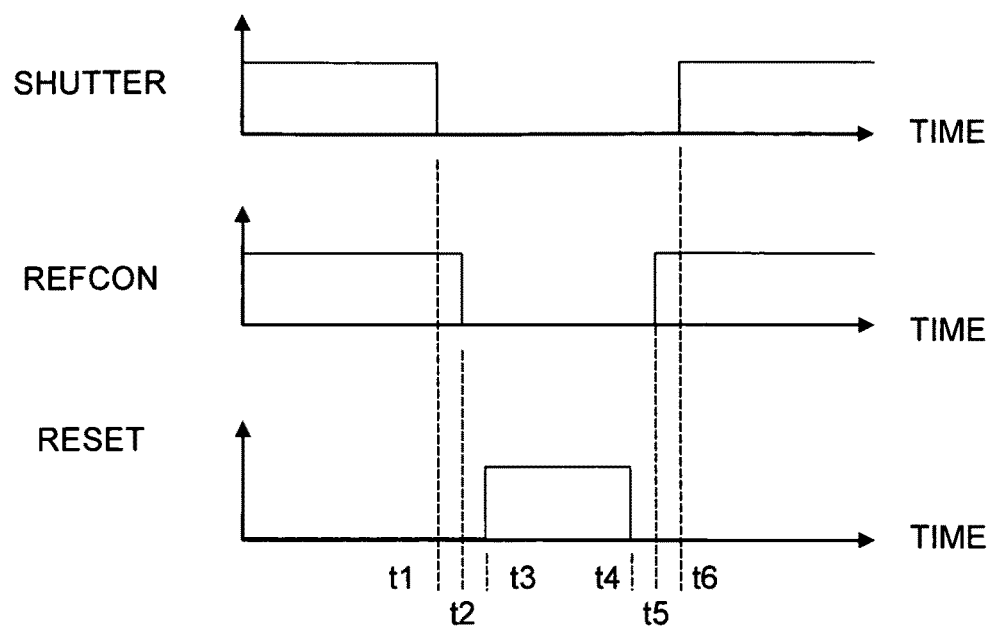
FIG. 6 depicts waveforms and signals associated with a typical CMR operation, according to embodiments of the present invention.

For added flexibility the waveforms and signals associated with a symbol may be programmable. Thus new symbols can be defined on the fly by storing their waveform and signal definition in memory preferably inside the chip. One of the entries in Table 3 above is common mode resets or CMR. By way of example, FIG. 6 depicts how a CMR operation can be defined, where the definition for the symbol preferably is stored in a memory block. FIG. 6 depicts control signals sent to IC chip 110 for a CMR operation, where corresponding signal and noise accumulation is depicted in Table 3. In FIG. 6, the symbol header is CMR, and the following waveform definitions are used. In a Transition Time table for control signal Shutter, the signal falls at $t_1$ and rises at $t_6$. In a Transition Time table for control signal Refcon, the signal falls at time $t_2$ and rises at $t_5$. (Refcon is a control signal that sets the integration voltage across the detection integration capacitors to a reference magnitude.) In a Transition Time table for control signal Reset, the signal rises at $t_3$ and falls at $t_4$.

An exemplary overall microcoded sequence will now be described with reference to FIG. 7. Preferably an instruction memory stores instructions, and a symbol memory stores symbol waveform definitions, and a processor reads the instructions sequentially and programs the waveform generator band with the waveforms for the symbol being executed. Preferably the analog-to-digital bank converts differential and common mode values from the pixel into digital values. Under control of instruction memory symbol memory and processor, the computational logic takes the values from the ADC and memory computes a function from them and stores the result back in array data memory, which stores the values from the computational logic. Under control of instruction memory symbol memory and processor, the IO preferably sends the results of data memory off-chip, or elsewhere.

Figure 7:
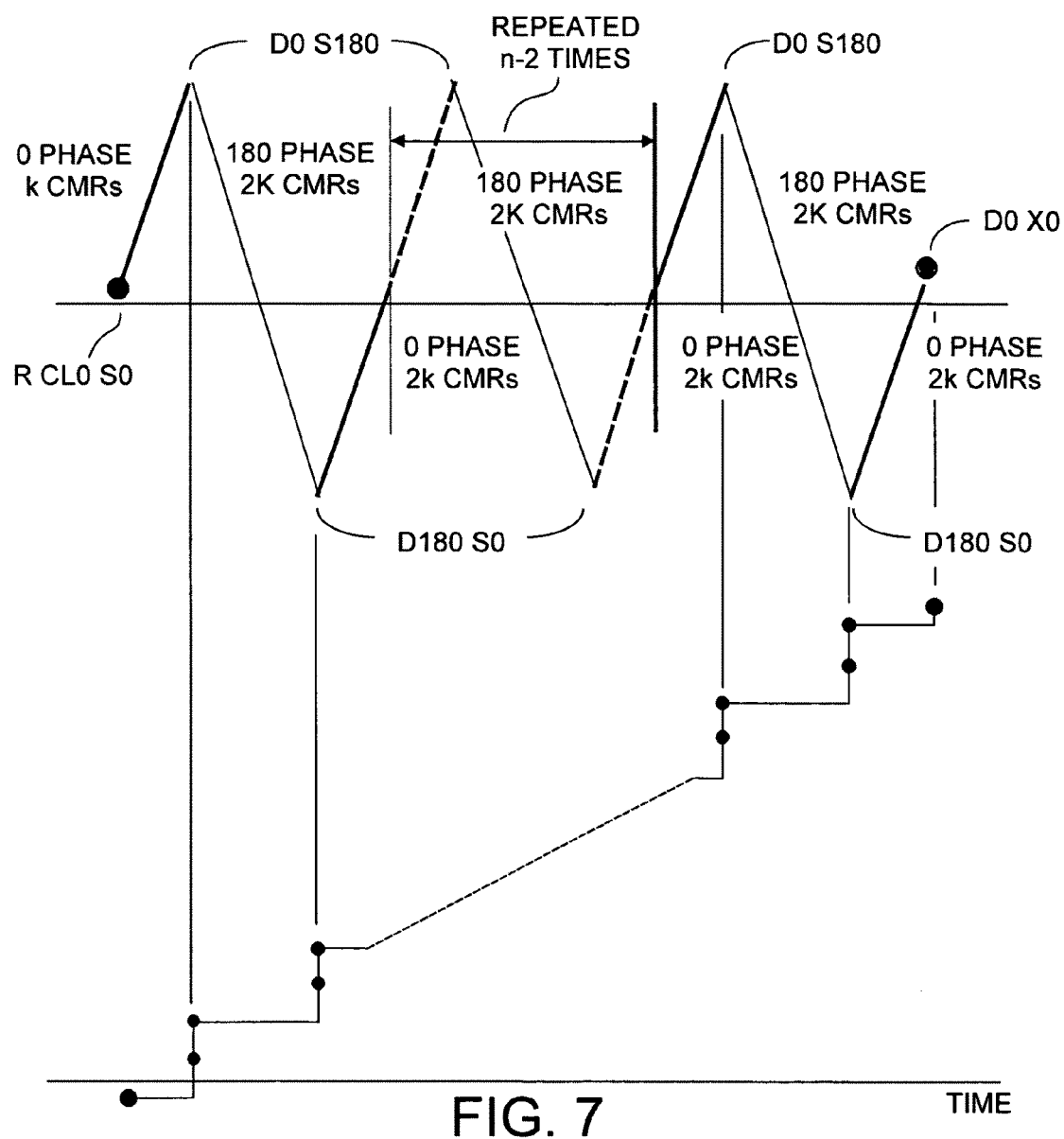
FIG. 7 depicts exemplary differential detector output values responsive to application of a sequence, according to embodiments of the present invention.

With further reference to FIG. 7, an exemplary sequence might be represented by:

RST:CL0:S0:((I0:CMR:$)^k$: D0:S180:(I180:CMR:$)^{2k}$: D180: S0:(I0:CMR:$)^k)^n$: D0E:X0

For which associated waveforms in IC chip 110 are shown in FIG. 7, wherein the pixel is reset and the accumulator for phase 0° and 180° is cleared. The pixel values are then sampled into the accumulator with a minus (−ve) sign. This is followed by k 0-phase integrate CMR sequences (0 half cycle), at which point the pixel value is sampled with a positive sign. This double sampling has the effect of only storing the pixel output accumulated between the two samples (S0 and D0). The next two samples (S180 and D180) add the value accumulated by the 2 k 180°-phase integrate CMR (180° full cycle) with a minus (−ve) sign. After an initial sample S0, if n=1, a 0 half cycle is performed and sequence is terminated by the corresponding D0. If n>1, instead of a 0 half-cycle, a 0 full cycle is performed before the corresponding D0. This pattern is repeated by alternating between 0° and 180° phase depending on n. The sequence is terminated by a 0°-phase half cycle in the end before the data is read out by X0 operation. Note that D0 and S180 (respectively D180 and S0) are essentially the same operation, and in FIG. 7 they often appear to be consecutively. Thus rather than doing two analog-to-digital conversions and then adding (or subtracting) each result to memory, it is computationally more efficient to do a single analog-to-digital conversion, multiply the result by two, and add (or subtract) the result from memory. The tool described herein would take into account the actual waveforms of IC chip 110 and model the behavior in terms of signal and noise components for every operation in the sequence as shown in Table 3.

Thus, when used with a TOF system, aspects of the present invention provide a systems analysis tool or method 200 that includes a component, and a simulator that can keep track of noise and signal as the TOF sequence is interpreted. Preferably noise is categorized into noise components, e.g., into Shot, flicker, KT/C and ADC, and accumulation noise. At each instruction in the sequence produced by programmable sequence generator 230, noise and signal are computed analytically. Further, at each step, noise can also be computed empirically, e.g., by processor 210 executing a routine stored in memory 220. Preferably noise is accumulated over multiple instructions to produce the noise for the entire sequence. Preferably embodiments of the present invention can provide a reverse lookup function, also storable in memory 220. The present invention may be built into a complex analytical tool.

In one embodiment, inputs into the analytical tool are magnitude of active emitted laser light and magnitude of ambient light falling on the imaged target object 20. In response, the analytical tool preferable outputs signal to noise ratios (S/N). Preferably a third parameter can be determined by the analytical tool if any two of emitted active laser light, ambient light, and S/N are known. Thus in alternate embodiments, analytical tool 200 can receive as input the S/N requirement and the maximum ambient light condition, and the analytical tool will determine and output the minimum amount of active emitted laser light required to satisfy the TOF system S/N requirement. A preferred implementation of this embodiment is to progressively increment magnitude of active emitted laser light, under control of programmable sequence generator 230, and to evaluate S/N for each magnitude value of the active emitted laser light. Of course alternate reverse lookup methods may be stored in memory 220 and used instead.

Figure 4:
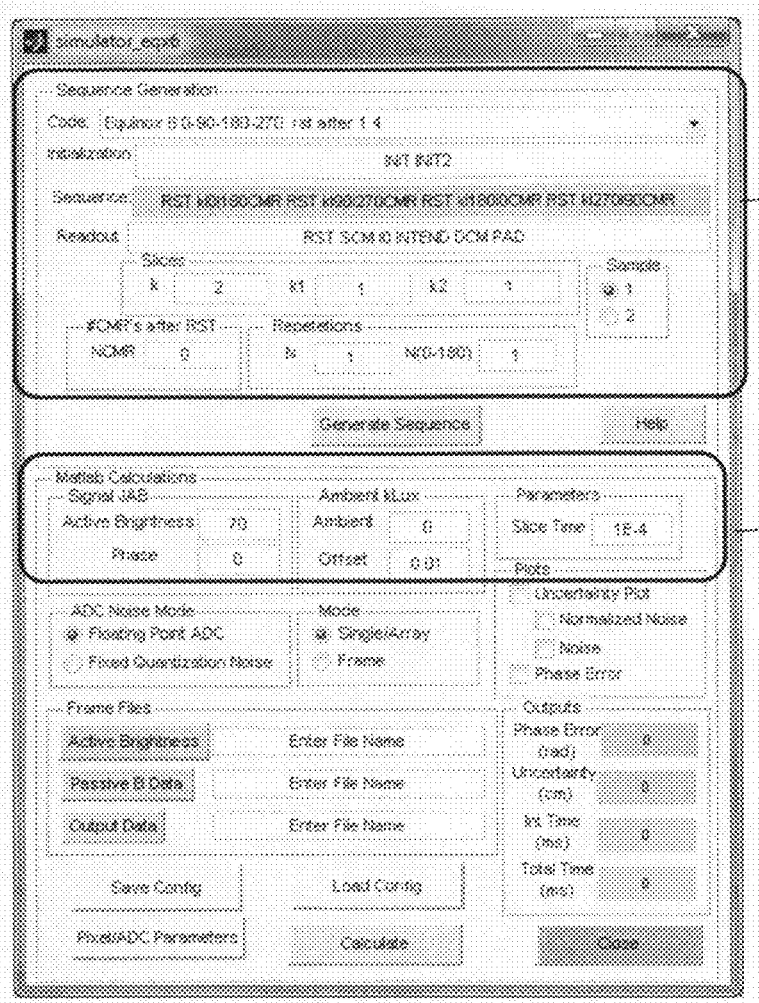
FIG. 4 depicts an exemplary interface showing programmable parameter values input to an embodiment of the present invention.
Figure 5:
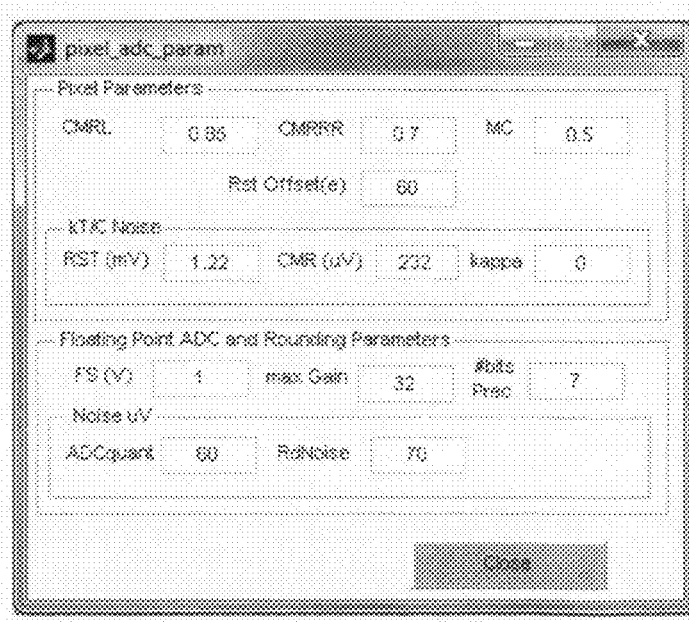
FIG. 5 depicts an exemplary interface showing further programmable parameter values input to an embodiment of the present invention.

FIGS. 4 and 5 are screen captures depicting exemplary interface to the analytical tool, although other interfaces are of course possible. The upper portion of FIG. 4 depicts current characteristics of programmable sequence generator 230, and the middle portion of FIG. 4 depicts exemplary input signal parameters input to the analytical tool. FIG. 5 depicts an exemplary interface showing programmable analog-to-digital converter parameters and pixel parameters, although other or additional parameters could of course be shown.

While embodiments of the present invention have been described with respect to use in noise simulation analysis for the design of modern TOF systems, it will be appreciated that embodiments of the present invention may also be used to predict noise simulation analysis for other systems as well.

Modifications and variations may be made to the disclosed embodiments without departing from the subject and spirit of the present invention as defined by the following claims.

What is claimed is:

1. A processor implemented method to estimate signal to noise (S/N) of an electrical system that has a sequence of operations Oi, each of said operations Oi combining a signal and statistical noise from prior operations in said sequence with signal and statistical noise at a current operation in said sequence of operations Oi, the method including the following steps:
   (a) at each sequence in said operations Oi, combining effects of each independent statistical noise source independently of other independent statistical noise sources such that each independent statistical noise source is self-correlating;
   (b) combining final noise contribution of each independent statistical noise source at an output of said system to yield a final statistical noise estimate for said system;
   wherein said final statistical noise estimate resulting from step (b) is more accurate than if statistical noise models for independent noise sources at each sequence in operations Oi were combined using RMS values.

2. The processor implemented method of claim 1, wherein step (b) yields signal and noise estimates exceeding accuracy of a closed form expression of noise following operation Oi.

3. The processor implemented method of claim 1, wherein accumulated noises are derived from at least one noise component selected from a group consisting of (i) shot noise, (ii) KT/C noise, (iii) flicker noise, (iv) ADC quantization noise, (v) digital accumulation noise, and (vii) thermal noise.

4. The processor implemented method of claim 1, further including accumulating at least one value of at least one of signal and noise, before carrying out step Oi.

5. The processor implemented method of claim 1, wherein step (a) is carried out using at least one of (i) hardware and (ii) software.

6. The processor implemented method of claim 1, wherein step (b) is carried out using at least one of (i) hardware and (ii) software.

7. The processor implemented method of step 1, wherein at step (a) each said independent statistical noise source is modeled as being self-correlating such that computation is carried out absent recourse to use of absolute RMS magnitudes.

8. The processor implemented method of step 1, wherein said electrical system includes at least one of (i) an imaging system, (ii) a depth system, and (iii) a time-of-flight depth system.

9. A sub-system to estimate signal to noise (S/N) of an electrical system that has a sequence of operations Oi, each of said operations Oi to combine a signal and statistical noise from prior operations in said sequence with signal and statistical noise at a current operation in said sequence of operations Oi, the sub-system including:
   a processor; and
   a memory including code to instruct the processor to compute effects, at each sequence in said operations Oi, of each independent statistical noise source independently of other independent statistical noise sources such that each independent statistical noise source is self-correlating;
   to combine final noise contribution of each independent statistical noise source at an output of said system to yield a final statistical noise estimate for said system;
   wherein said final statistical noise estimate yielded by said combining is more accurate than if statistical noise models for independent noise sources at each sequence in operations Oi were computed.

10. The sub-system of claim 9, wherein said combining yields signal and noise estimates exceeding accuracy of a closed form expression of noise following operation Oi.

11. The sub-system of claim 9, wherein accumulated noises are derived from at least one noise component selected from a group consisting of (i) shot noise, (ii) KT/C noise, (iii) flicker noise, (iv) ADC quantization noise, (v) digital accumulation noise, and (vii) thermal noise.

12. The sub-system of claim 9, further including code instructing the processor to accumulate at least one value of at least one of signal and noise, before carrying out step Oi.

13. The sub-system of claim 9, wherein said code includes instructions to model each said independent statistical noise source as being self-correlating such that computation is carried out absent recourse to use of absolute RMS magnitudes.

14. The sub-system of claim 9, wherein said electrical system includes at least one of (i) an imaging system, (ii) a depth system, and (iii) a time-of-flight depth system.

* * * * *